Nov. 11, 1952  R. A. FINDLAY  2,617,273
CONTINUOUS CRYSTALLIZATION APPARATUS AND PROCESS
Filed April 25, 1949  2 SHEETS—SHEET 1

INVENTOR.
R. A. FINDLAY
BY Hudson & Young
by K. E. Prince
ATTORNEYS

Nov. 11, 1952 R. A. FINDLAY 2,617,273
CONTINUOUS CRYSTALLIZATION APPARATUS AND PROCESS
Filed April 25, 1949 2 SHEETS—SHEET 2

INVENTOR.
R. A. FINDLAY
BY Hudson & Young
by R. E. Prince
ATTORNEYS

Patented Nov. 11, 1952

2,617,273

UNITED STATES PATENT OFFICE 2,617,273

CONTINUOUS CRYSTALLIZATION APPARATUS AND PROCESS

Robert A. Findlay, Bartlesville, Okla., assignor to Phillips Petroleum Company, a corporation of Delaware Application April 25, 1949, Serial No. 89,512

8 Claims. (Cl. 62—124)

This invention relates to the separation of mixtures by crystallization. In a more specific aspect, it relates to an apparatus for carrying out a continuous process of separation by crystallization. In another aspect, it relates to a continuous crystallization process. In still another specific aspect, it relates to a method of separating solid solutions and an apparatus for carrying out this method.

As certain types of mixtures are cooled, a temperature is reached at which a portion of the mixtures separates as a solid. This solid material is, from a theoretical standpoint, a pure substance, but from a practical standpoint, it is not pure. If the solid material is separated from the mother liquor and is melted and again partially frozen, the frozen material will be of higher purity than that obtained in the first freezing. Successive crystallizations will result in a product of increasing purity. If the constituents form a eutectic, the liquid will approach the eutectic composition. If the temperature of the mother liquor from the first crystallization step is further reduced, there is formed another batch of solid material, which may be removed and recrystallized, as described above, to obtain material richer with respect to the higher melting components. With each crystallization, the mother liquor from which the crystals are removed becomes increasingly richer with respect to the lower melting component or components. If a sufficient number of the crystallization steps is carried out on a binary mixture, it is possible to produce a higher-melting fraction and a lower-melting fraction of fairly high purity with respect to the high-melting and low-melting components, respectively.

Ordinarily, separation by crystallization is a batch operation and is, consequently, time consuming and inefficient.

If the components of the starting material form mixed crystals on freezing, the degree of purification obtainable in any one crystallization may be small and a considerable number of steps may be required to effect substantially complete separation.

I have invented an apparatus for carrying out a continuous multi-stage separation of organic materials by crystallization.

The principal object of my invention is to provide an apparatus for carrying out multi-stage separations by crystallization.

Another object of my invention is to provide a process for separating mixtures of compounds into higher-melting and lower-melting fractions.

Another object of my invention is to provide a continuous process for the multi-stage separation of solid solutions by crystallization.

Other objects and advantages of my invention will be apparent upon reading the following drawings, description, and claims.

Figure 1:
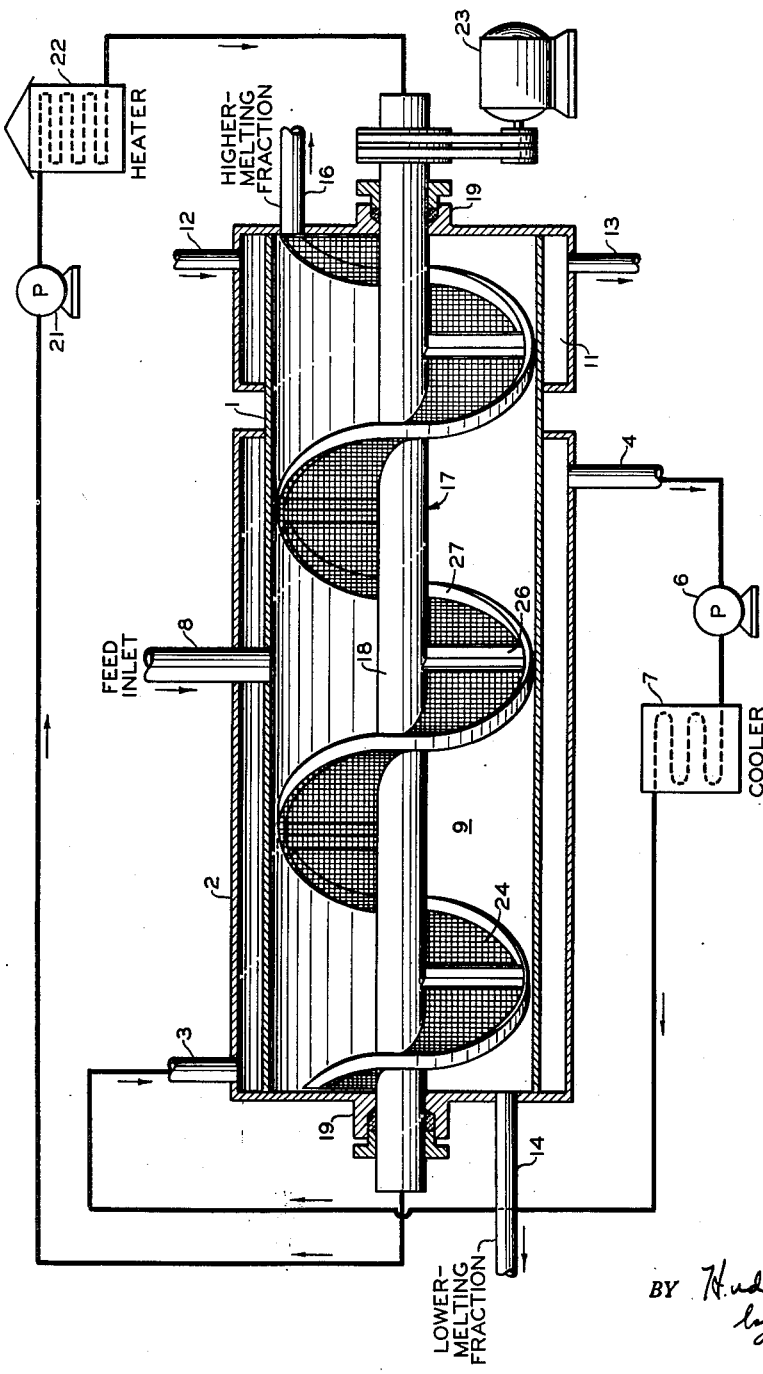
Figure 1 is a cross sectional view of my apparatus.

In Figure 1, a portion of tubular housing 1 is surrounded by a cooling jacket 2 having an inlet 3 and an outlet 4, from which a conduit leads to pump 6, cooler 7, and back to inlet 3. Feed inlet 8 is provided for introducing material into separation zone 9, enclosed within housing 1. Surrounding another portion of housing 1 is a heating jacket 11 having inlet 12 and outlet 13 for circulating a heat exchange fluid therethrough. Product outlet 14 is provided in the cooler end of separating zone 9 and outlet 16 is provided in the heated end. Axially positioned within said housing is a conveyor screw or auger generally designated 17. The shank or center shaft 18 of said screw is a hollow tube which extends through the end walls of said housing through stuffing boxes 19 and is provided with appropriate connections for circulating a heating fluid through said tube to pump 21 and heater 22. Motor 23 has a driving connection with screw 17 for rotating said screw. The vanes 24 of said screw are made of wire gauze or similar foraminous material and are provided with appropriate stiffening members 26, which extend radially outward from the axle 18. At the outer edge of the foraminous vane 24 is a helical stiffening member 27, which is secured to stiffening members 26 and to which the foraminous vane is attached at its outer edge.

Figure 2:
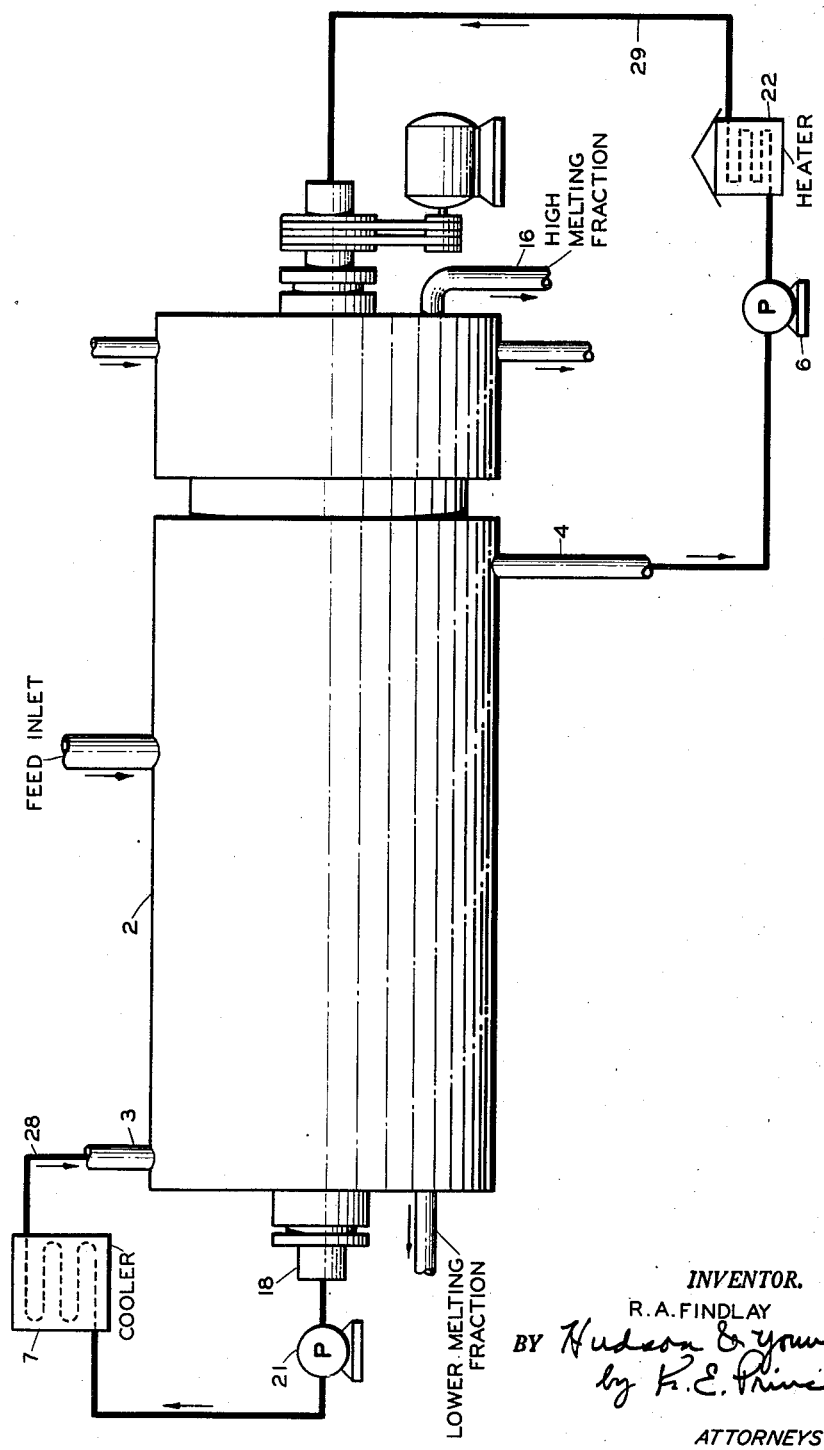
Figure 2 is an elevational view of another modification of my apparatus showing the preferred flow of refrigerant.

In Figure 2, the refrigerant outlet 4 leads to pump 6 and thence into heater 22 from which conduit 29 leads to central axle 18. The effluent from axle 18 passes through pump 21 to cooler 7 and thence via conduit 28 to jacket inlet 3.

Operation

My invention is adapted to effecting separations of mixtures into higher- and lower-melting fractions and is particularly advantageous in separating binary mixtures which form solid solutions, in which case, the problem of obtaining complete separation of the components is principally one of carrying out a sufficient number of stages and separating the solid from the mother liquor at each stage. My apparatus provides a means for effecting a plurality of crystallization stages as a continuous process.

Considering now the process and apparatus as applied to the separation of a simple binary mixture which does not form a eutectic and which does not exhibit the maximum or minimum freezing point phenomenon, the feed material is introduced into the separation zone 9 through feed inlet 8 at a point intermediate the ends of said zone. While it is desirable to maintain said zone full of liquid, it may be operated with the zone only partially filled. A suitable refrigerant is circulated through cooling jacket 2, the refrigerant inlet 3 being positioned near the end of housing 1 so that the separation zone will be coolest at that end. A portion of the liquid feed mixture is frozen by his abstraction of heat through jacket 2, and the frozen material is scraped from the side wall and is moved toward the warmer end of said cooling jacket by means of the conveyor screw 17. The helical stiffening member 27 acts as a scraper to remove the frozen material from the inner walls and move it forward along the bottom of the apparatus. The radial vanes are made of angle iron or of similar construction so that as they rotate across the bottom, they scoop the frozen material from the trough of the housing and raise said frozen material towards the top, permitting it to fall back onto the heated central shaft where it is melted and mixed with the adjacent liquid. Thus, with each freezing and remelting stage, the frozen material is moved forward through the conveyor a distance less than the horizontal distance between the radial vanes. As the frozen material is moved forward, as described, it displaces an equal volume of liquid which flows in the opposite direction. This causes the liquid as it flows toward the cooler end of the separation zone to become increasingly leaner with respect to the high-melting component or fractions. Consequently, the solid being moved toward the hotter end of the separation zone becomes increasingly richer with respect to the higher-melting component of the mixture.

A stream of liquid is continuously withdrawn through outlet 14 in the cooler end of the separation zone and a stream of higher-melting fraction is withdrawn through outlet 16, the rate of removal being such that the desired degree of purity is obtained by the separation. Fresh feed material is introduced into the apparatus at such a rate that the desired liquid level is maintained.

In my drawing, I have shown a heating jacket 11 surrounding the end of the apparatus from which the higher-melting fraction is removed. This heating jacket may be omitted if the heat absorbed through the sidewall and that added through the central shaft of the conveyor is sufficient to melt the solid material reaching that end of the apparatus.

The higher-melting fraction that has been separated is removed through line 16. This fraction has been heated until it begins to melt and may be removed as a solid in the form of a slurry. If desired, the heating can be carried on still further and the higher-melting fraction can be removed as a liquid.

Various types of apparatus have previously been proposed for causing countercurrent flow of liquid and solid material for the purpose of effecting a separation such as I have described. However, when the difference between the composition of the liquids and the solid material is only slight, as is usually the case, equilibrium between the solid material and the liquid surrounding it is attained so slowly that such processes are not of any commercial value. It should be noted that in my apparatus, the solid material is being continuously removed from the sidewall and is moved forward and remelted. As the solid is moved forward through the separation zone, it is remelted and mixed with a liquid which is richer with respect to the higher-melting fraction of the solid than the liquid from which the solid was originally frozen. This results in a plurality of stages, the number depending on the number of freezing and remeltings that occur throughout the separation zone. Since there is a temperature differential between the ends of the separation zone, with the hotter end being that one toward which the conveyor continuously moves the solid material, the material being crystallized on the sidewalls becomes progressively richer with respect to the higher-melting component as it approaches the hotter end of the separation zone.

The number of stages necessary to obtain the separation depends, of course, on the degree of purity required and the difference between the composition of the solid and liquid equilibrium compositions. The degree of separation obtainable may also be controlled by the rate of removal of the higher- and lower-melting fractions. At a faster removal rate, the separation is not as complete as can be obtained at a slower removal rate.

The foraminous vane or thread of the conveyor screw may be of any material such as wire gauze or perforated material as long as there is free flow of liquid through the vanes instead of around. An extremely porous or screen-like material is preferable because it presents little obstruction to the flow of liquid and this type of construction will result in more thorough mixing of the liquid with that formed by melting the frozen solid.

If desired, all or a portion of the cooling liquid, as it leaves the jacket through outlet 4, may be heated and passed as a heat transfer liquid through the center shaft or axle of the conveyor screw. For reasons of economy and more efficient use of heat, this is probably the preferred method of operating. I have shown the refrigerating and heating systems as being separate, which is also operable.

For mixtures of chemical compounds which form eutectics, complete separation cannot be obtained in my apparatus. In such a case, that component present in excess of the eutectic ratio can be obtained in substantially pure form as the higher-melting fraction while the lower-melting fraction has the eutectic composition. If the system exhibits a maximum or minimum freezing point, the separation cannot be carried beyond that point. In the case of a maximum freezing point, the higher-melting fraction corresponds to the composition at such a maximum point while the lower-melting fraction may be a pure component. However, the formation of eutectics or maximum or minimum freezing mixtures complicates the separation problem and separation cannot be accomplished by simple recrystallization methods. My invention is of more value in the separation of simple binary mixtures or mixtures which form solid solutions on freezing.

Except for feed mixtures having the exact eutectic composition, my invention is not limited to any specified types of separation but may be useful in any system, depending on the degree of separation required and upon the product desired to be obtained in pure form. My invention is defined and limited only by the following claims.

Having described my invention, I claim:

1. A continuous fractional crystallization apparatus comprising, in combination, a horizontal tube having closed ends, outlet ports adjacent each end of said tube for removing liquid from said tube, a feed inlet in the side wall of said tube at a point intermediate the ends, means for maintaining a relatively low temperature at one end of said tube and a relatively high temperature at the opposite end of said tube, a close-fitting foraminous conveyor screw axially positioned in said tube for removing frozen solid from the walls of said tube and moving the solid through said tube in a direction parallel to the longitudinal axis thereof, from the relatively cold end of said tube towards the relatively hot end, and means for heating the axle of said conveyor screw.

2. A continuous fractional crystallizer comprising, in combination, a horizontally disposed tube, product outlets adjacent each end of said tube, a feed inlet in the side wall of said tube intermediate the ends, a close-fitting, perforate-threaded conveyor-screw axially disposed within said tube, means for heating the shaft of said conveyor screw, a cooling jacket surrounding an upstream portion of said tube for maintaining a relatively low temperature in a portion of said tube, and means for maintaining a relatively high temperature in said tube at the downstream end of said conveyor.

3. A fractional crystallization apparatus for separating a multi-component mixture into a high-melting fraction and a low-melting fraction which comprises, in combination, a closed horizontally-disposed tube having an outlet in one end for removing a high-melting fraction, an outlet in the opposite end for removing a low-melting fraction, and a feed inlet in the side wall at a point intermediate the ends, means for cooling the side wall of said tube from the outlet for the low-melting fraction to a point intermediate the feed inlet and the opposite end of said tube, a close-fitting conveyor screw axially disposed within said tube, said screw having a foraminous thread, a helical stiffening member along the outer edge of said thread and a plurality of radial vanes extending radially from the central shaft of said screw to said helical stiffening member for scraping frozen material from the bottom of said tube and depositing said frozen material on the shaft of said screw, and means for heating said shaft.

4. A fractional crystallization apparatus comprising, in combination, a horizontally disposed tube having closed ends, outlet ports adjacent each end, an inlet port in the side wall intermediate the ends of said tube, a cooling jacket surrounding said tube from one end to a point intermediate the feed inlet and the opposite end, a heating jacket surrounding the remainder of said tube, a close-fitting perforate threaded screw axially positioned within said tube for scraping frozen material from the walls of said tube and moving said frozen material towards the heated end of said tube, the shaft of said screw having a central longitudinal passageway for the passage of a heat transfer liquid therethrough, a plurality of vanes extending radially outward from the central shaft along the perforate thread, the width of said fins being less than the pitch of the screw, said fins being adapted to scrape the solid material from the bottom of the tube and deposit it onto the heated screw shaft, means for circulating a cooling medium through said cooling jacket, means for circulating a heating fluid through the heating jacket and through the screw shaft, and means for rotating said screw.

5. A fractional crystallization apparatus comprising, in combination, a horizontally positioned jacket tube having closed ends, means for introducing a liquid feed into said tube at a point intermediate the ends thereof, means for maintaining a relatively low temperature at one end and a relatively high temperature at the other end, a close-fitting conveyor screw comprising a foraminous, helical thread supported on a hollow shaft axially positioned within said tube, a plurality of vanes extending radially outward along the perforate vane to the edge of said thread and longitudinally along the shaft for a distance less than the pitch of the screw, and means for circulating a heating fluid through the hollow conveyor shaft.

6. The process for separating a mixture of organic chemical compounds which upon partial solidification forms a more dense solid than liquid phase into a higher-melting fraction and a lower-melting fraction which comprises maintaining an elongated liquid body of the mixture in a horizontal position, maintaining a temperature differential between the opposite ends of said body, abstracting heat from said liquid at its periphery in sufficient quantity to freeze a portion of said mixture throughout the length of said body, moving the frozen material in the direction of the hotter end of said liquid body, subjecting said material to a series of alternate heating and cooling steps in indirect heat exchange with a heating medium and a cooling medium so as to partially melt and resolidify said frozen material, melting said frozen material in contact with the liquid at a point nearer the hotter end, removing a portion of the liquid reaching the hotter end as a higher-melting fraction, removing a portion of the liquid reaching the colder end of said body as a lower-melting fraction and adding to said body a sufficient amount of fresh mixture to replace that portion removed.

7. A fractional crystallization apparatus for separating a multi-component mixture into a higher-melting fraction and a lower-melting fraction which comprises, in combination, a horizontal, enclosed screw conveyor having a product outlet in each end, a feed inlet intermediate said ends, the screw of said conveyor having a perforate thread and a central passageway extending longitudinally through the shaft, a cooling jacket around the conveyor housing, a first conduit connection joining the outlet of said jacket with the inlet of said central passageway, means in said first conduit for heating the liquid flowing therethrough, a second conduit connection joining the outlet of said central passageway with the inlet of said cooling jacket, means in said second conduit for cooling the liquid flowing therethrough, and means for circulating the refrigerant through the system.

8. A process for separating a mixture of organic compounds which upon partial solidification forms a more dense solid than liquid phase into a higher-melting fraction and a lower-melting fraction which comprises the steps of maintaining a horizontal elongated body of the liquid mixture, maintaining a temperature differential between the ends of said body, the cooler end being maintained at the temperature at which the lower-melting fraction first begins to solidify and the warmer end being maintained at the temperature at which the higher-melting fraction begins to melt, continuously abstracting heat from said body of liquid at its periphery to solidify a portion of said material in contact with the remaining liquid, continuously moving the solidified material from the periphery of said body toward the axis and horizontally toward the warmer end of said body, continuously adding heat to said body along its longitudinal axis to melt at least a portion of said solid material, thereby melting and recrystallizing the higher-melting component of said mixture at a plurality of points between the cooler and hotter end of said body, the movement of said solid to the warmer end displacing an equal volume of liquid towards the cooler end, removing a liquid lower-melting fraction from the cooler end and removing a higher-melting fraction from the warmer end of said body.

ROBERT A. FINDLAY.

REFERENCES CITED

The following references are of record in the file of this patent:

UNITED STATES PATENTS

| Number | Name | Date |
| --- | --- | --- |
| 1,576,137 | Johnson | Mar. 9, 1926 |
| 1,836,211 | Weiland et al. | Dec. 15, 1931 |
| 1,836,212 | Weiland et al. | Dec. 15, 1931 |
| 1,868,406 | Bonath | July 19, 1932 |
| 1,906,534 | Burke | May 2, 1933 |
| 1,951,923 | Cartoux | Mar. 20, 1934 |
| 2,034,969 | Behreus | Mar. 24, 1936 |
| 2,121,208 | Milligan | June 21, 1938 |
| 2,129,464 | Cunningham | Sept. 6, 1938 |
| 2,160,533 | Bonath | May 30, 1939 |
| 2,408,934 | Kjellgren | Oct. 8, 1946 |
| 2,435,792 | McArdle | Feb. 10, 1948 |
| 2,470,116 | Swietoslawski | May 17, 1949 |
| 2,540,977 | Arnold | Feb. 6, 1951 |